Patented Nov. 5, 1935

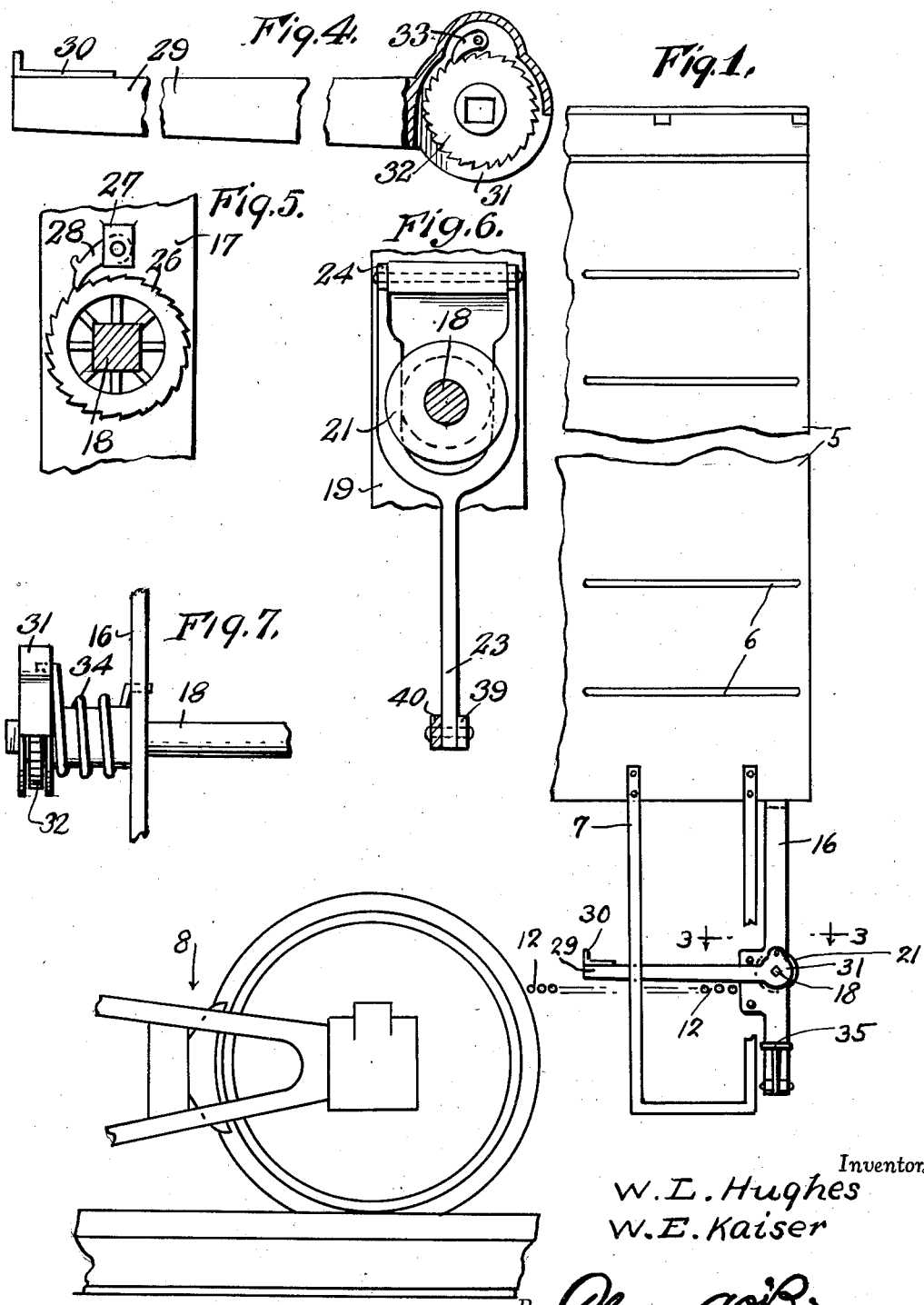

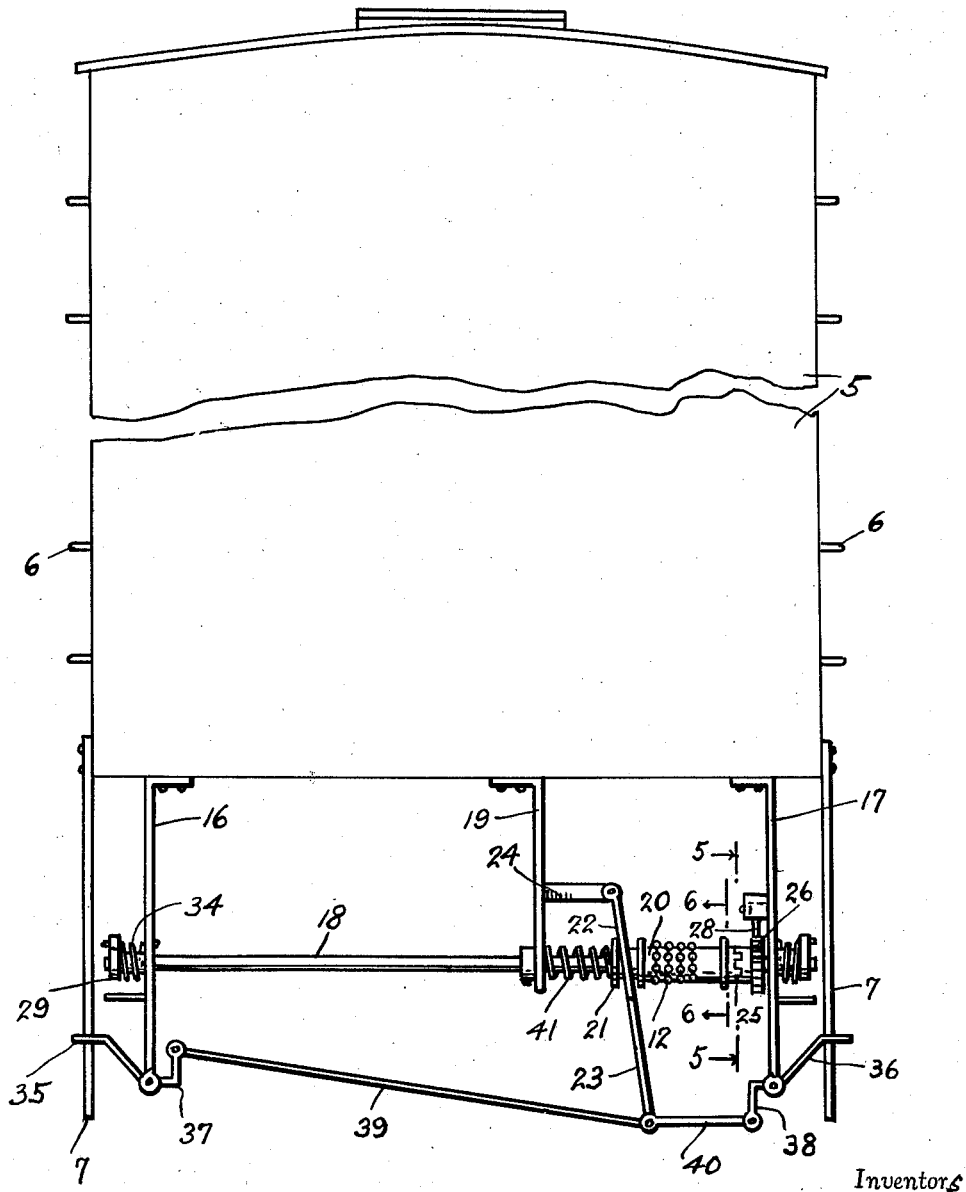

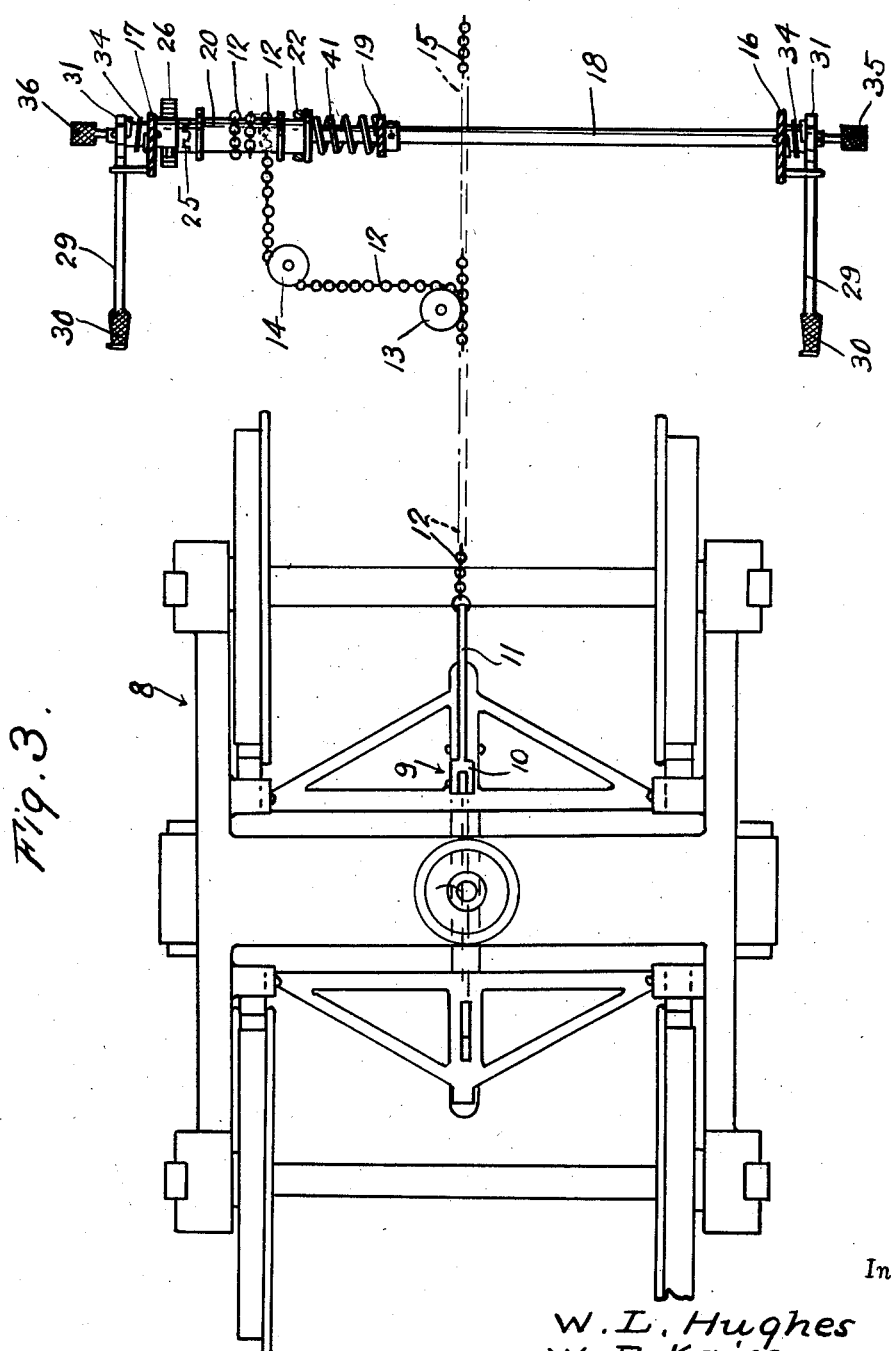

2,020,059

UNITED STATES PATENT OFFICE 2,020,059

FOOT OPERATED TRAIN BRAKE

William Lee Hughes and Walter Edward Kaiser, Little Rock, Ark.

Application July 11, 1934, Serial No. 734,676

1 Claim. (Cl. 188—107)

This invention appertains to new and useful improvements in brakes for freight cars, the principal object of the invention being to provide a foot brake whereby the usual freight car brakes can be applied from a point adjacent the ground so as to eliminate the present practice and requirement of trainmen to mount the car to operate the usual hand wheel for applying the brakes.

Another important object of the present invention is to provide a novel brake controlling mechanism for freight cars wherein the car brake can be not only applied from a position adjacent the ground but also quickly released when desired.

These and various other important objects and advantages of the invention will become apparent to the reader of the following specification.

In the drawings:

Figure 1 is a fragmentary side elevational view of one end of a freight car showing one of the foot brake pedals.

Figure 2 is an end elevational view of a freight car showing the mechanism in normal position.

Figure 3 is a horizontal sectional view taken substantially on line 3—3 of Figure 1.

Figure 4 is a fragmentary side elevational view of one of the brake pedals shown partly in section.

Figure 5 is an enlarged fragmentary vertical sectional view taken substantially on line 5—5 of Figure 2.

Figure 6 is a fragmentary enlarged vertical sectional view taken substantially on line 6—6 of Figure 2.

Figure 7 is a fragmentary side elevational view of the operating shaft and one of the foot pedals.

Referring to the drawings wherein like numerals designate like parts, it can be seen in Figures 1 and 2, that numeral 5 generally refers to the usual box car provided with the rungs 6 along which the brakeman can climb to reach the usual hand wheel at the top of the car.

At each side of the car 5 and at each end thereof is the step frame 7. Figure 3 shows a truck of the car generally referred to by numeral 8 and this is provided with a brake mechanism generally referred to by nueral 9 which is equipped with a lever 10 to which the pivotal arm 11 connects. Numeral 12 represents the chain which is disposed around the pulleys 13 and 14. Numeral 15 represents the chain as it would extend to the usual hand wheel at the top of the car which in the present mechanism is dispensed with.

Bracket members 16 and 17 depend from the bottom of the car 5 and have the elongated shafts 18 journaled therethrough. An intermediate bracket 19 extends downwardly from the bottom of the car and also has the shaft 18 disposed therethrough.

On the shaft 18 is the drum 20 on which the chain 12 is wound, this drum being freely rotatable on the shaft 18 and also slidable, the same being provided at one end with a collar 21 to receive the yoke 22 of the shift lever 23 which is pivotally secured at its upper end to the arm 24 on the bracket 19. The other end of the drum 20 is detachably connectible by clutch teeth 25 with the cog 26 which is secured to the shaft 18. As is clearly shown in Figure 5, a boss 27 on the bracket 17 supports a pawl 28 which rides against the cog wheel 26.

At each end of the shaft 18 is located a foot pedal which consists of the lever 29 having a tread plate 30 and a bifurcated end portion 31 enclosing a ratchet wheel 32. This bifurcated end of the lever 29 carries the pawl 33 which rides against the ratchet wheel 32. The bifurcated end of the lever 29 is swingable on the shaft 18, while this end of the shaft is squared for disposition through the squared opening in the ratchet wheel 32. A spring 34 is interposed between the bifurcated end of the lever 29 and the adjacent bracket 16 or 17, so that the foot pedal will be returned to the normal horizontal position shown in Figure 1 whenever pressure is released therefrom.

For releasing the drum 20 so that the brake can be returned to inoperative position, a pair of swingable or rockable foot pedals 35 and 36 are provided at the lower ends of the brackets 16 and 17, respectively. The foot pedal 35 has an upturned end portion 37, while the inner end portion of the pedal 36 has a downturned end portion 38. A pivotal link rod 39 extends from the end portion 37 to the lower end of the yoke arm 23 while a pivotal link rod 40 extends from the end 38 of the pedal 36 to the lower end of the yoke arm 23.

It can now be seen that whenever one or the other of the pedals 29 is depressed, the shaft 18 is rotated so as to wind the chain 12 on to the drum 20. Step by step, action of the foot pedal will wind the chain as tight as is desired and the brake is held thus by the meshing teeth 25 between one end of the drum 20 and the gear 26 and this is maintained by the coiled spring 41 interposed between the lower end of the bracket 19 and the collar 21 of the drum.

When it is desired that the drum be released so that the brake will be disengaged, one or the other of the two foot release pedals 35 and 36 is depressed, which results in the swinging of the arm 23 so as to slide the drum 20 on the shaft 18 against the tension of the spring 41. Thus the teeth 25 will part and free the drum 20 on the shaft so that the same will spread to free the chain 12.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

In a brake control for railroad rolling stock cars, a rotary drum, a flexible element extending from the brake and wound on the drum, foot operating means for the drum mounted adjacent the bottom of the car, a shaft on which the said drum is slidable, said foot means being adapted to actuate the shaft, a ratchet wheel secured to the shaft, clutch teeth between the drum and the ratchet wheel, a pawl catch for the said ratchet wheel, and means for shifting the said drum to release the same from the said wheel, said means including a foot lever at each side of the car and link members connecting the foot levers to the drum.

WILLIAM LEE HUGHES.
WALTER EDWARD KAISER.